United States Patent [19]
Stefansky

[11] Patent Number: 5,847,896
[45] Date of Patent: *Dec. 8, 1998

[54] DISK DRIVE INCLUDING SLOPED BASE AND COVER

[75] Inventor: Frederick Mark Stefansky, Longmont, Colo.

[73] Assignee: Conner Peripherals, Inc., San Jose, Calif.

[ * ] Notice: The portion of the term of this patent subsequent to Apr. 15, 2017, has been disclaimed.

[21] Appl. No.: 135,307

[22] Filed: Oct. 12, 1993

Related U.S. Application Data

[63] Continuation of Ser. No. 474,463, Feb. 2, 1990, abandoned, which is a continuation of Ser. No. 147,804, Jan. 25, 1988, Pat. No. 4,965,684.

[51] Int. Cl.[6] ................................................. G11B 5/596
[52] U.S. Cl. .................................... 360/78.12; 360/97.03; 360/903
[58] Field of Search ....................... 360/75, 77.02, 360/78.04, 78.12, 97.01, 97.03, 98.01, 99.08, 98.07, 105, 106, 108, 900–904; 364/708

[56] References Cited

U.S. PATENT DOCUMENTS

| | | | |
|---|---|---|---|
| 4,638,383 | 1/1987 | McGinlay et al. | 360/77.04 |
| 4,639,863 | 1/1987 | Harrison et al. | 360/97.01 |
| 4,654,735 | 3/1987 | Izraelev et al. | 360/105 |
| 4,724,499 | 2/1988 | Bratvold | 360/106 |
| 4,772,974 | 9/1988 | Moon et al. | 360/78.04 |
| 4,814,913 | 3/1989 | Mihara et al. | 360/98.07 |
| 4,890,174 | 12/1989 | Chalmers et al. | 360/77.05 |

OTHER PUBLICATIONS

Article entitled Wang Announces Its Long–Awaited Laptop Computer, InfoWorld, Oct. 20, 1986.
Article entitled The Wang LapTop, Byte, Oct, 1987.
ALPS brochure "3.5–inch Hard Disk Drive DRP Series" Dec. 31, 1987, ALPS Electric.
1987 ALPS Show brochure, Dec. 31, 1987, ALPS Electric.
Plus, "Hardcard—the easy–to–use 10 megabyte Hard disk Drive on a Plug–in Card", 1985.

*Primary Examiner*—Roy N. Envall, Jr.
*Assistant Examiner*—Steven R. Garland
*Attorney, Agent, or Firm*—Fliesler, Dubb, Meyer & Lovejoy

[57] ABSTRACT

A low height disk drive having an overall height of approximately one inch (1"). The drive includes a head disk assembly, including a base plate, a disk rotatably supported on the base plate, a motor for rotating the disk, at least one head for reading information from and writing information on the disk, an actuator, supported on said base plate and responsive to control signals, for selectively positioning the head with respect to the disk, and a cover sealably attached to the base plate to enclose the storage means, the head, and the actuator. The disk drive also includes control circuitry for generating control signals, and for providing information signals to and receiving information signals from the head. The head disk assembly and the control circuitry have a combined height of approximately one inch or less.

1 Claim, 5 Drawing Sheets

DISK DRIVE INCLUDING SLOPED BASE AND COVER

CONTINUATION APPLICATION INFORMATION

This application is File Wrapper Continuation of Ser. No. 07/474,463, filed Feb. 2, 1990, now abandoned, which is a continuation of Ser. No. 07/147,804, filed Jan. 25, 1988, now U.S. Pat. No. 4,965,684.

CROSS-REFERENCE TO RELATED APPLICATIONS

1) DISK DRIVE SYSTEM CONTROLLER ARCHITECTURE, inventors John P. Squires, Tom A. Fiers, and Louis J. Shrinkle, filed Jun. 2, 1987, Ser. No. 057,289, now U.S. Pat. No. 4,979,056;

2) DISK DRIVE SOFTWARE SYSTEM CONTROLLER ARCHITECTURE, inventors John P. Squires, Tom A. Fiers, and Louis J. Shrinkle, Ser. No. 488,386, filed Feb. 23, 1990, now abandoned which is a continuation of Ser. No. 057,806 filed Jun. 2, 1987, now abandoned;

3) DISK DRIVE SYSTEM CONTROLLER ARCHITECTURE UTILIZING EMBEDDED REAL-TIME DIAGNOSTIC MONITOR, inventor John P. Squires, Ser. No. 423,719, filed Oct. 18, 1989, now U.S. Pat. No. 4,979,055, which is a continuation of Ser. No. 058,289; filed Jun. 2, 1987, now abandoned; and 4) LOW-POWER, HARD-DISK DRIVE SYSTEM ARCHITECTURE, inventors John P. Squires and Louis J. Shrinkle, filed Feb. 4, 1988, Ser. No. 152,069.

BACKGROUND OF THE INVENTION

1. Field of the Invention.

The present invention relates to disk drives; more particularly, to hard (or fixed) disk drives.

2. Description of the Related Art.

Developments in personal computers, portable computers and lap top computers have prompted reductions in the size and increases in memory capacity of disk drives. Attempts to provide further reductions in the size and weight, and increases in durability and memory capacity of existing disk drives have been met with limited success. The size (particularly the height) and weight of fixed or hard disk drives and the inability of existing hard disk drives to withstand physical shocks and/or vibrations have been factors which have prevented the incorporation of fixed disks in lap-top and in some cases even larger portable computers.

Existing disk drives incorporate a large number of mechanical parts. Each part in a disk drive also represents an increase in the weight of the drive and the space occupied by the drive. A large number of mechanical components makes manufacturing difficult and expensive and increases the possibility and probability of the mechanical failure of the drive. Importantly, the number of mechanical components is related to the ability of the drive to survive physical shocks and vibrations.

Resistance to physical shocks and vibrations is critical to protecting the disk or disks, the head or heads, and the various bearings in a disk drive from damage; in particular, it is necessary to prevent damage to the disks which can cause a loss of data, and damage to the heads or the bearings which can end the life of a drive, resulting in a total loss of data. Prior disk drives, however, have limited resistance to physical shocks. Resistance to physical shocks is of paramount importance in portable computers.

In conventional drives mechanical distortion or flexing of the mechanical components of a disk drive which support the heads and disks causes tracking problems by moving the heads, which are mounted at one point on the supporting components, relative to the disk, which is mounted at another point on the supporting components. The heads associated with the top and bottom surfaces of a disk can move relative to the disk to the point where the different heads are in different cylinders—a cylinder being defined as a vertical segment representing the same track on the top and bottom surfaces of a disk. This problem is known as mechanical off-track. This problem is compounded by increased track densities.

Another problem with prior disk drives is the difficulty in sealing the drive to protect the disks from contaminants. This difficulty arises in part, from the large number of points at which access is provided to the environment in which the disk resides. These access points are utilized to bring to the interior of the disk drive electrical circuits which provide current to the motor which rotates the disk, transmit data signals to and from heads which read and record information on the disks, and in some instances, provide current to a voice coil for positioning the head (or heads) with respect to the disk or disks.

Many of these disadvantages of prior disk drives are attributable to the casing—a three-dimensional casting or so-called "toilet bowl"—in which the disks reside. Such a casing is a large, three dimensional piece of cast metal, usually aluminum, having a round portion where the disks reside—hence the name "toilet bowl." A top plate covers the entire open top of the casing, forming a seal therewith. The spindle on which the disks rotate is supported by and extends through both the casing and the cover.

The protrusion of the spindle through the casing and the cover provides possible points of entry for contaminants. Further, in disk drives using stepper motors to position the heads with respect to the disk, the stepper motor is located outside of the casing, requiring a seal between the stepper motor and the casing. Acknowledging the existence of points where contaminants can enter the disk drive, manufacturers of conventional disk drives provide a breather filter and design the disk drives so that the rotation of the disks causes the disk drives to exhaust air through leaks in the seals and to intake air only through the breather filter. However, a fairly course filter must be provided in the breather filter for a flow of air to exist, and thus contaminants enter the disk drive through the filter paper.

A cast casing is difficult to manufacture with precision, particularly the location of mounting points for elements of the drive supported by the casing. Mounting holes must be drilled after the casing is cast, and the mounting holes must be aligned with the casing and with each other. More importantly, however, a three-dimensional, cast casing flexes due to thermal stresses causing the above-mentioned mechanical offtrack problems.

In conventional disk drives which use a voice coil to pivot an actuator arm in order to position the heads with respect to the disk, a flex circuit, having one end attached to the actuator arm and the other end attached to a fixed point in the disk drive, transfers the information signals to and from the heads. The standard orientation of such a flex circuit is a loop extending away from the disk. The distance between the point at which the flex circuit is attached to the actuator and the end of the disk drive is limited, and thus the radius of the arc or curve of the flex circuit is small and the length of the flex circuit itself is limited. Therefore, the entire flex circuit moves when the actuator arm is pivoted and a torque is exerted on the actuator arm by the flex circuit. The torque exerted on the actuator arm must be compensated for, either added to or subtracted from the torque created by the voice coil, when performing a seek operation. This compensation is complicated by the fact that the torque exerted on the actuator by the flex circuit varies with the position of the actuator.

Various types of locking (or latch) devices have been used to lock the arm of a voice coil in a particular position when the disk drive is not operating. The trend in latch devices is to utilize a high power unit which is separately assembled to provide reliability. However, high power latch devices generate a large amount of heat which is not desirable in a disk drive or any other area in a computer. Further, the operation of conventional latch devices can be position dependent. Thus, the orientation of the disk drive and the computer in which the disk drive is installed could effect the reliability of the latch device. Such a positional dependence of reliability is not satisfactory for portable computers.

SUMMARY OF THE INVENTION

It is, therefore, an object of the present invention to provide a disk drive having a low height and a low weight.

A further object of the present invention is to provide a disk drive having a small number of mechanical elements.

A further object of the present invention is to provide a disk drive assembly which is resistant to damage from physical shocks.

Another object of the present invention is to provide a disk drive which is easy to assemble.

Another object of the present invention is to provide a disk drive in which any mechanical off tracking of the heads is mechanically minimized and electronically corrected.

Another object of the present invention is to reduce the torque exerted on the actuator by the flex circuit.

Another object of the present invention is to provide a disk drive in which the disk and other components associated therewith are supported and positioned on a base plate instead of a cast casing.

Another object of the present invention is to provide a disk drive assembly in which a single electrical connector transfers all electrical currents and data signals from the environment in which the disks reside to the exterior of the environment, and in which a header which communicates those electrical signals through the base plate is the only communication between the interior and exterior of the drive.

The present invention is directed to a low height, low weight disk drive, comprising a base plate lying in a first plane, storage means (a disk) rotatably supported on the top of the base plate and lying in a second plane making an angle with the first plane, interactive means (or heads) for reading information from and writing information on the storage means, actuator means supported at a first end of the top of the base plate for selectively positioning the interactive means with respect to the storage means in response to control signals, control means supported from the bottom of the base plate for generating control signals and for providing information signals to and receiving information signals from the interactive means, connection means supported at a second end of the base plate for interconnecting the control means with an external processing unit, and a cover sealably attached to the top of the base plate to provide a controlled environment between the cover and the base plate. A header provides electrical interconnections between the control means and the controlled environment between the cover and the base plate, and inside the controlled environment a reverse flex circuit electrically interconnects the header with the interactive means and the actuator means. The reverse flex circuit is arranged so that it exerts a minimum torque on the actuator means.

A specific advantage of the present invention is that the disk drive has a reduced height with respect to conventional disk drives utilizing disks of approximately the same diameter. In particular, a three and one-half inch (3.5") single platter drive of the present invention has an overall height of one inch (1"). Furthermore, the disk drive of the present invention is light in weight—a 3.5 inch single platter drive of the present invention weighs slightly more than one pound. The reduced height is achieved by providing the base plate with a sloped profile which accommodates the external connectors (connection means) at one end of the drive and the internal components (for example, the actuator means) at the other end.

Another advantage of the disk drive of the present invention is that a minimum number of components are utilized which makes the drive easy to assemble and low in weight.

A further advantage of the present invention is that the reverse flex circuit allows the actuator means to move with a minimum restriction, thus decreasing access times and increasing seek accuracy.

A further advantage of the present invention is that a single electrical connector (header) transfers all electrical signals between the exterior and the interior of the casing, thereby reducing the possibility of the introduction of contaminants to the controlled environment within the casing. Importantly, the disk drive of the present invention does not require a breather filter.

A further advantage of the present invention is that the disk drive assembly is resistant to damages caused by physical shock and vibration.

A further advantage of the present invention is that the small number of mechanical parts reduces the possibility of breakdowns due to mechanical failures.

BRIEF DESCRIPTION OF THE DRAWINGS

FIGS. 1–7 illustrate the disk drive of the present invention. In particular:

DESCRIPTION OF THE PREFERRED EMBODIMENT

A disk drive according to the present invention will be described with reference to FIGS. 1–7. The disk drive described herein includes, for example, a single hard disk with a magnetic coating and utilizes Winchester technology; however, the disk drive of the present invention may utilize various numbers of disks and other types of disks, for example, optical disks, and other read/write technologies, for example, lasers. The diameter of the disks utilized in the disk drive of the present invention have a diameter on the order of 3.75 inches, or so-called "3.5 inch" disks; the disk drive of the present invention can be implemented with disks of other diameters whether larger or smaller than 3.75 inches.

Figure 1:
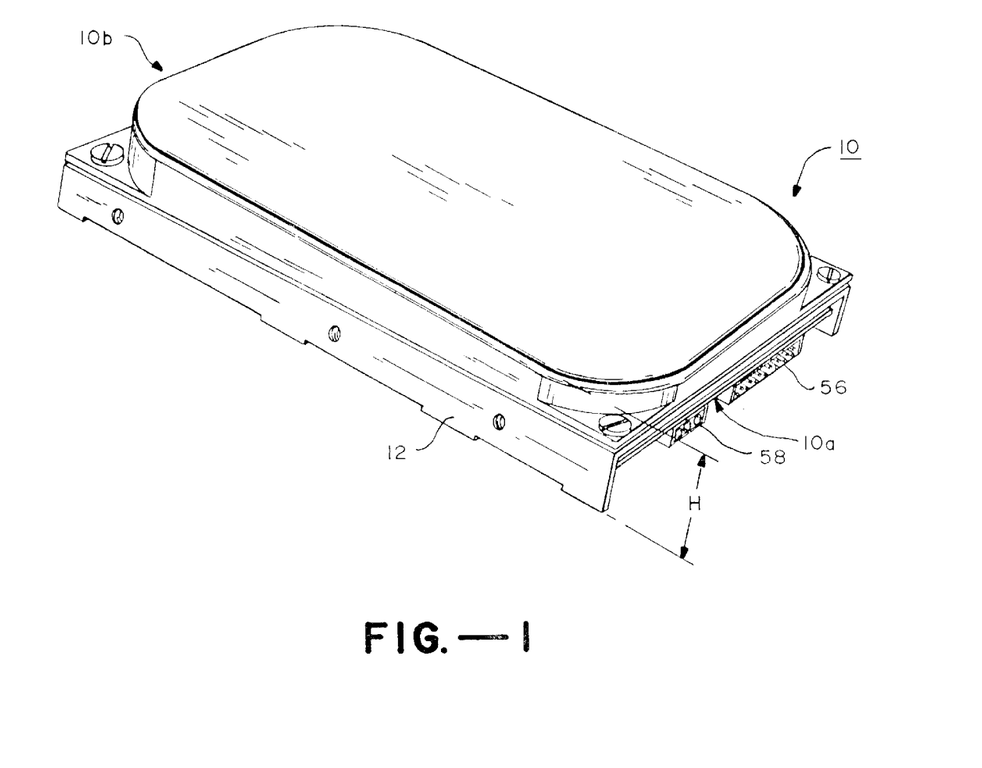
FIG. 1 is an isometric view of a disk drive according to the present invention.

FIG. 1 shows the disk drive of the present invention as assembled. Although not to scale, FIG. 1 illustrates the relationship between the length, width, and height of the disk drive, and thus low profile of the disk drive. In particular, the height "H" of the disk drive of the present invention is one inch (1").

One feature of the disk drive of the present invention which provides the low height of the drive is the sloped profile of base plate 12 and cover 14. The sloped profile provides extra vertical space below base plate 12 at the first end 10a of the disk drive and provides extra vertical space between base plate 12 and cover 14 at the second end 10b of the disk drive 10. If the sloped profile were not provided, the amount of space allocated above and below base plate 12 would be the maximum amount of space provided at the respective first and second ends 10a, 10b of the disk drive 10; accordingly, the overall height of the disk drive would be increased.

The disk drive of the present invention has the following outline dimensions: Height 1.0" (2.54 cm); Length 5.75" (14.61 cm); and Width 4.0" (10.61 cm), and a total weight slightly over one (1) pound. Thus, the disk drive of the present invention is one-half (½) of the size of a one-half (½) height 5¼" inch disk drive. Importantly, the disk drive of the present invention weighs approximately ⅓ to ½ of the weight of standard 3.5" disk drives of 20 Mb capacity. Even greater proportional reductions are provided when the disk drive of the present invention is formatted for 40 Mb capacity without any change in size or weight.

The cover 14 is sealably attached to base plate 12 to provide a controlled environment between base plate 12 and cover 14. A gasket 16 (FIG. 4) between base plate 12 and cover 14 provides the seal. The ability to provide a controlled environment alleviates the need for a breather filter and allows the disk drive of the present invention to use an internal air filtration system. The seal provided by gasket 16 is stable, during operation of the disk drive, at pressures experienced at altitudes from 200 feet below sea level to 10,000 feet above sea level.

Figure 2:
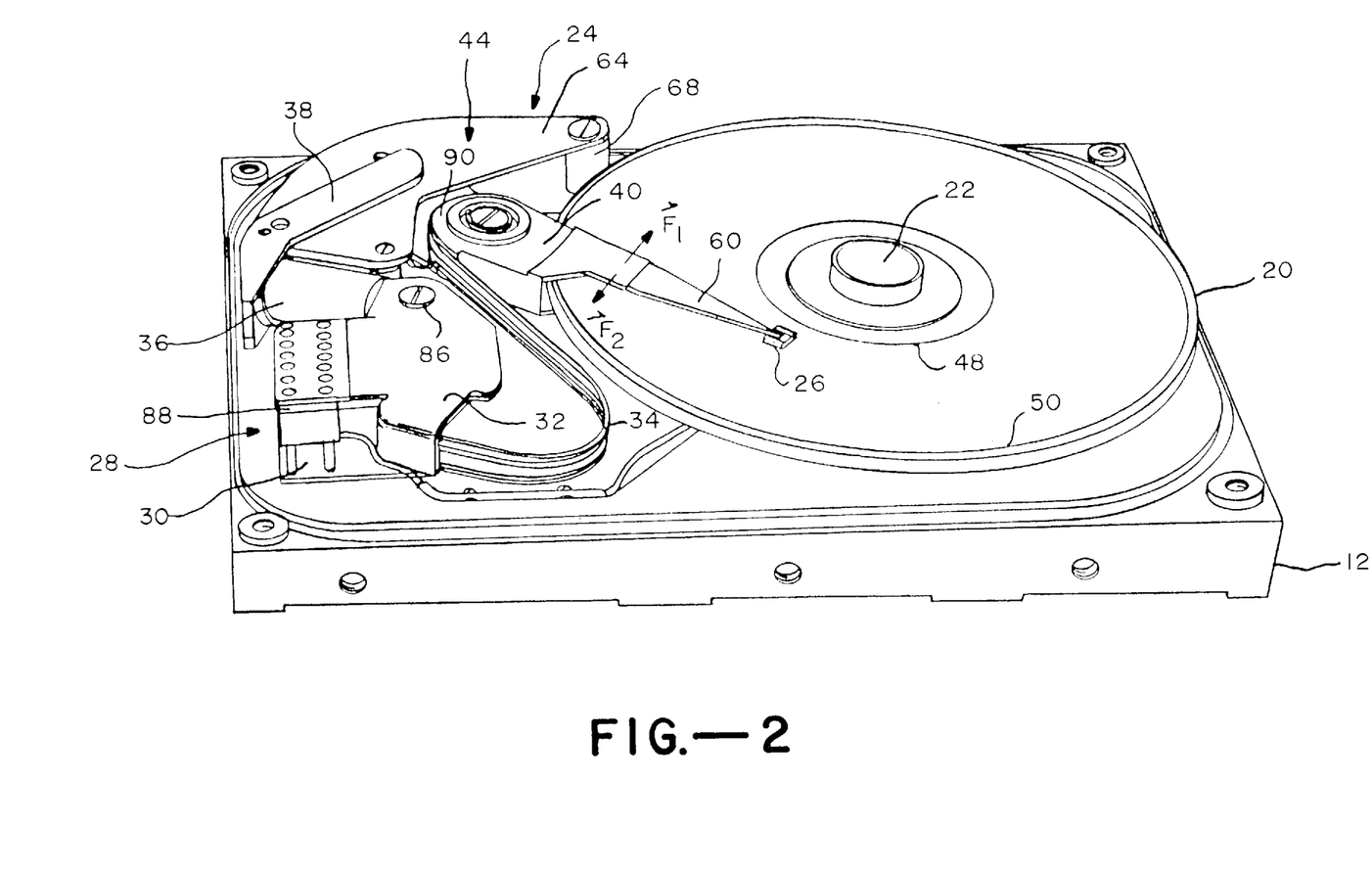
FIG. 2 is an isometric view of the disk drive of the present invention with the cover removed.

As shown in FIG. 2 the internal components of the disk drive are separated into three interrelated groups: disk 20 and spin motor 22, actuator assembly 24 for positioning heads 26 with respect to disk 20, and header assembly 28 including header 30, bracket 32, reverse flex circuit 34 and coil 36 for pivoting latch arm 38.

Actuator assembly 24 includes pivotable actuator arm 40, heads 26 (FIG. 4) mounted at a first end of actuator arm 40, an actuator coil 42 mounted at a second end of actuator arm 40 on the opposite side of the pivot point from the first end of the actuator arm, and a magnet structure 44. Magnet structure 44 supports magnets 46 (FIG. 4) and its components, as described in detail below, are formed of magnetically permeable material to provide returns for the magnetic fields generated by magnets 46. The magnet structure 44 and actuator coil 42 are arranged so that a current in coil 42 passes through the magnetic fields created by magnets 46 to create a force which pivots actuator arm 40. Currents passing in opposite directions of coil 42 create torques in opposite directions and pivot actuator arm 40 to position heads 26 at all locations between and including inside and outside diameters 48 and 50 of disk 20.

In a conventional disk drive utilizing a voice coil, a flex circuit is provided in the region between header 30 and actuator arm 40. Reverse flex circuit 34 curves toward the disk, thereby allowing latch coil 36 to be placed between header 30 and actuator arm 40.

A printed circuit assembly (or control means) 52 is attached to the bottom of base plate 12. Header 30 carries all of the electrical signals from the printed circuit assembly 52 to the controlled environment between base plate 12 and cover 14. Header 30 has a minimum number of pins due to the fact that a DC motor requiring only three (3) leads is utilized. Such a motor is described in U.S. Pat. No. 4,876, 491.

Figure 3:
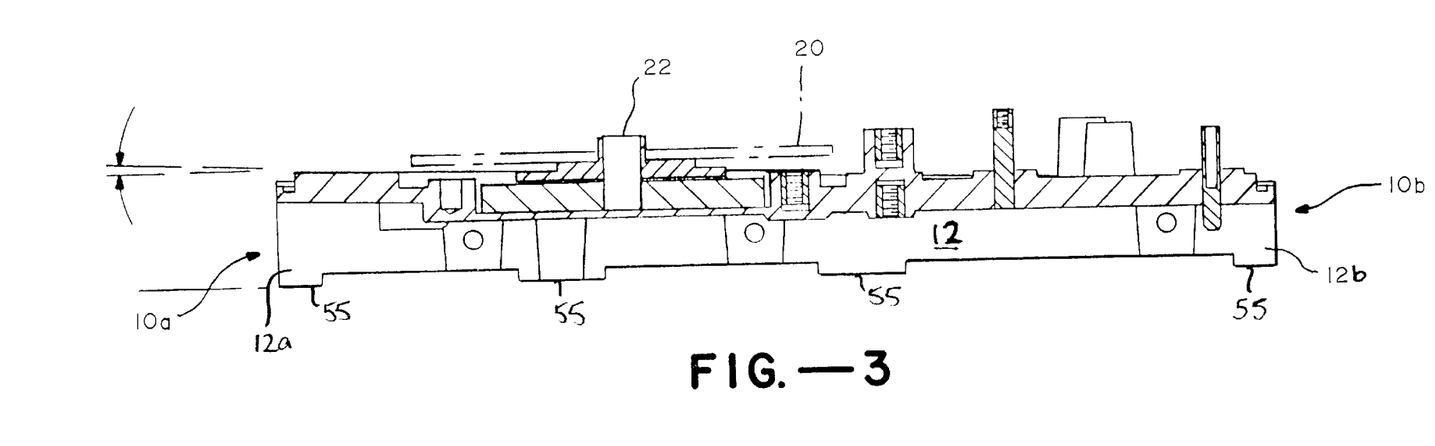
FIG. 3 is a cross-sectional view of the disk drive of the present invention along line 3—3' of FIG. 2.
Figure 5:
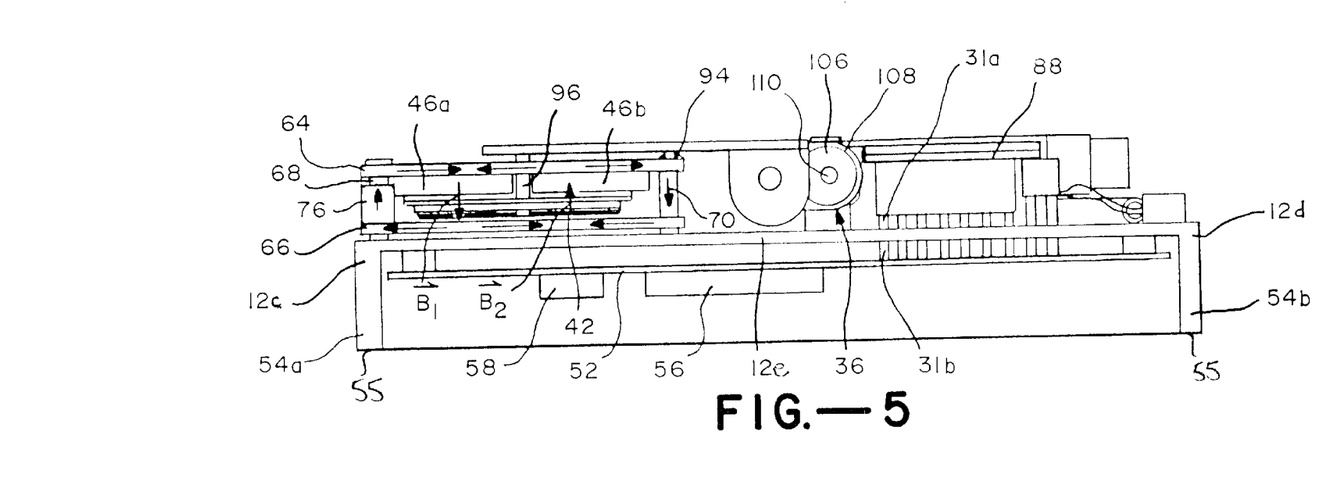
FIG. 5 is an end view of the disk drive of the present invention.
Figure 6:
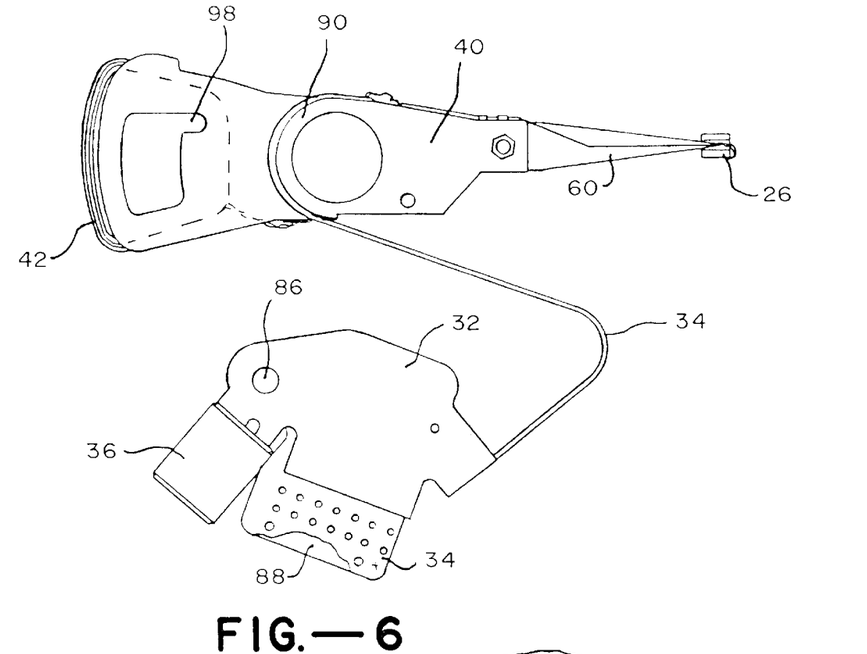
FIG. 6 illustrates the actuator assembly.

The structure of the disk drive 10 of the present invention which provides the disk drive with a low overall height will be described with reference to FIG. 3, which is a cross-sectional view along line 3–3' in FIG. 2, and FIG. 5. As show in FIG. 5, base plate 12 includes two rails 54a and 54b at first and second sides 12c and 12d of base plate 12. Rails 54a and 54b are constructed so that the mounting surface 12e of the base plate 12 sits at an angle with respect to the plane of the surface on which rails 54a and 54b rest. This angled relationship of base plate 12 and the support surface provides more room below base plate 12 at the first end 12a of the base plate than at the second end 12b of the base plate. Only a small amount of space is necessary for printed circuit assembly 52, including the components mounted thereon; however, it is necessary to provide a connector 56 and a power plug 58 on printed circuit assembly at the first end 12a of base plate 12, both of which require more space than the printed circuit assembly 52. The slope of base plate 12 provides the necessary vertical space for connector 56 and power plug 58 beneath the first end of the base plate 12a. Connector 56 provides an interface between the printed circuit assembly 52 and a host computer (not shown) and power plug 58 provides an interface between printed circuit assembly 52 and an external power source (not shown).

Conversely, disk 20 is the only component located above the first end of the base plate 12a, whereas the actuator assembly 24 is located above the second end of the base plate 12b. Actuator assembly 24 requires more vertical space than disk 20 and the slope of base plate 12 provides more space above the second end of the base plate 12b than above the first end of the base plate 12a in order to accommodate the actuator assembly 24. Thus, the base plate 12 and the printed circuit assembly 52 are mutually complementary parts (i.e., have complementary configurations) which effectively utilize the space available to reduce the height of the disk drive 10. As shown in FIG. 1 the portion of cover 14 which meets with base plate 12 has an angle which corresponds to the angle of the base plate, and thus the top of the cover 14 is parallel with the support surface. Therefore, even though the base plate is sloped, the profile of the disk drive 10 is a rectangle as opposed to a parallelogram.

Disk 20 lies in a plane which is parallel to the support surface and which-forms an angle with the plane of base plate 12. All of the support points on the mounting surface 12e of base plate 12 are designed so that the internal components (e.g., actuator assembly 24) lie in plane parallel to the plane of disk 20 and the plane defined by support points 55 of rails 54a, 54b.

The structure and operation of actuator assembly 24 will be explained with reference to FIGS. 4–7. The function of the actuator assembly 24 is to position heads 26 with respect to the surfaces of disks 20 by pivoting actuator arm assembly 40. More specifically, to position the heads 26 over individual tracks on disk 20. Heads 26 are supported on actuator arm 40 by flexures 60. A bearing cartridge 62, which is fixed to the base plate 12, is inserted in actuator arm 40 to provide a pivot point. Actuator arm 40 is attached to bearing cartridge 62 by a clip ring 63. Using clip ring 63 instead of epoxy allows the bearing cartridge 62 to be tested prior to assembly and cleaned independently of the actuator arm 40. Actuator coil 42 is provided on actuator arm 40 on the opposite side of the pivot point from heads 26. Actuator arm 40, including all of the components attached thereto, is precisely balanced, i.e., equal amounts of weight are provided on either side of the pivot point so that the positioning of heads 26 is less susceptible to linear shock and vibration.

The force utilized to pivot arm assembly 40 is provided by a voice coil assembly. The voice coil assembly includes actuator coil 42 and magnet structure 44. Magnet structure 44 comprises top and bottom plates 64, 66 formed of magnetically permeable material, support posts 68, 70 also formed of magnetically permeable material, and first and second magnets 46a, b attached to the top plate 64. Top and bottom plates 64, 66 in conjunction with support posts 68, 70 function as returns for the magnetic fields provided by first and second magnets 46a, b. It is important that there are no air gaps between support posts 68, 70 and either the top or bottom plate 64, 66; any air gap would create a discontinuity in the return, greatly reducing the strength of the magnetic field.

First and second magnets 46a, b have opposite poles attached to top plate 64 (e.g., the south pole of first magnet 46a and the north pole of second magnet 46b are attached to top plate 64) to provide first and second magnetic fields $\vec{B}_1$, $\vec{B}_2$ between respective ones of the first and second magnets 46a, b and bottom plate 66. First and second magnetic fields $\vec{B}_1$, $\vec{B}_2$, are encompassed in three closed magnetic field loops. The first closed magnetic field loop extends between the first magnet 46a and bottom plate 66 and passes through a return provided by bottom plate 66, first support 68, and top plate 64. The second closed magnetic loop passes from first magnet 46a to bottom plate 66, through bottom plate 66 and between bottom plate 66 and second magnet 46b, and from second magnet 46b to first magnet 46a via top plate 64. The third closed magnetic loop extends between bottom plate 66 and second magnet 46b and passes through a return provided by top plate 64, second support 70, and bottom plate 66. By containing the magnetic fields $\vec{B}_1$ and $\vec{B}_2$, in returns, the magnetic field intensity of each field is increased in the region between the respective first and second magnets 46a, b and bottom plate 66; the strength of the magnetic field in this region is directly related to the torque which the voice coil exerts on the actuator arm 40, and thus the rotational velocity of actuator 40 and the seek times for the drive.

Actuator coil 42 is positioned so that it carries a current in opposite directions in first and second magnetic fields $\vec{B}_1$ and $\vec{B}_2$.

The force on a current carrying wire in a magnetic field is proportional to the magnetic field intensity, and is expressed by the equation $\vec{F} = id\,\vec{l} \times \vec{B}$, where $\vec{F}$ is the force, i is the current, $\vec{l}$ is the length of the wire, and $\vec{B}$ is the magnetic field. Passing a current in opposite directions in actuator coil 42 provides respective forces $\vec{F}_1$ and $\vec{F}_2$ (FIG. 2); these forces $\vec{F}_1$ and $\vec{F}_2$ pivot actuator arm 40 in opposite directions.

Crash stops are provided to limit the pivoting movement of actuator arm 40 so that heads 26 travel only between selected inside and outside diameters 48, 50 of disk 20. An outside diameter crash stop is provided by a sleeve 76 (FIG. 5) fitted on support post 68. When the pivoting motion of actuator arm 40 places heads 26 at the outside diameter 50 of disk 20 a portion of the actuator arm 40 contacts outside diameter crash stop 76, thereby preventing further movement of the heads 26. An inside diameter crash stop is provided by the portion of the latch mechanism (FIG. 7) and is described below.

Reverse flex circuit 34 for carrying electrical signals from header 30 to heads 26 and actuator assembly 24 will be described with reference to FIGS. 2, 4, 6 and 7. The reverse flex circuit is separated into three portions. A first portion 80 carries current to actuator coil 42. A second portion 82 is a ground plane which separates the current carrying portion 80 from a third data carrying portion 84. The data carrying portion 84 provides signals to heads 26 for recording information on disk 20 and carries signals from the heads 26 to the printed circuit assembly 52, via header 30, when reading data from disk 20. Interference with the relatively weak data signals which would otherwise be caused by the larger currents necessary for actuator coil 42 passing through the first portion 80 of the reverse flex circuit 34 is prevented by the provision of ground plane 82.

The reverse flex circuit 34 is electrically connected to pins 31a of header 30; however, pins 31a also serve to position the reverse flex circuit 34. In particular, bracket 32 supports reverse flex circuit 34 and latch coil 36. Bracket 32 is attached to base plate 12 by a single attachment point 86 and is rotationally positioned by the engagement of reverse flex circuit 34 and pins 31a—the positioning of latch coil 36 being important to the operation of the latch mechanism as described below. A stiffener 88 is attached to reverse flex circuit 34 in the area where it engages pins 31a and is attached to bracket 32 to provide the rigidity necessary to rotationally position bracket 32, and to facilitate engagement of reverse flex circuit 34 and pins 31a. Reverse flex circuit 34 is parallel to the plane of base plane 12 in the region of header 31 but passes through a bend of approximately 90 degrees so that it forms the loop which extends towards disk 20 and connects header 30 to actuator assembly 24.

First portion 80 of reverse flex circuit 34 terminates at the point where reverse flex circuit 34 joins actuator arm 40; however, the second and third portions 82 and 84 wrap around a shoulder 90 of actuator arm 40 which surrounds bearing cartridge 62. Wrapping the second and third portions 82 and 84 of reverse flex circuit 34 around shoulder 90 provides access to current-carrying wires are provided on the side of the flex circuit which faces the base plate in the region where reverse flex circuit 34 engages pins 31a of header 30, and thus on the inside of the curved portion of reverse flex circuit 34 extending from bracket 32 to actuator arm 40. As the first and second portions 82 and 84 wrap around shoulder 90, the side of reverse flex circuit 34 on which the current-carrying wires are provided is exposed at the end of reverse flex circuit 34, facilitating the attachment of wires 91 which connect heads 26 to reverse flex circuit 34. If wires 91 were to be connected to reverse flex circuit 34 at the point where reverse flex circuit 34 first contacts actuator arm 40, it would be necessary to wrap wires 90 around reverse flex circuit 34 or to provide connections through the reverse flex circuit 34—both being more complex and less desirable manners of providing electrical connections between wires 91 and reverse flex circuit 34.

Any torque exerted on actuator arm 40 by any means other than the voice coil assembly affects the function of actuator assembly 24 in positioning heads 26 with respect to disk 20, particularly the track following any seek functions described in the above-referenced applications entitled DISK DRIVE SOFTWARE SYSTEM ARCHITECTURE and DISK DRIVE SOFTWARE SYSTEM ARCHITECTURE UTILIZING IMBEDDED REAL TIME DIAGNOSTIC MONITOR. The force provided by the voice coil assembly must be controlled to compensate for the force exerted by the reverse flex circuit 34. Accordingly, the radius R (FIG. 7) of the curve in reverse flex circuit 34 is made as large as possible to minimize the torque exerted on actuator arm 40 by reverse flex circuit 34. Indeed, the radius of the curve in reverse flex circuit 34 is approximately twice as large as the radius in the curve of a conventional flex circuit. In addition, the reverse flex circuit 34 moves in an essentially linear manner when actuator arm 40 rotates, whereas a conventional reverse flex circuit must bend throughout its curve. Accordingly, the torque exerted on actuator arm 40 by reverse flex circuit is greatly reduced with respect to the torque exerted by a conventional flex circuit.

Another advantage provided by reverse flex circuit 34 is the ability to place latch coil 36 in a position where a conventional flex circuit would be located, and thus to integrate latch coil 36 with reverse flex circuit 34 and bracket 32. Separate wires from header 30 to latch coil 36 are not necessary. Further, installing this integrated group of components requires fewer steps than installing individual components. In addition, the critical positioning of latch coil 36 is provided by reverse flex circuit 34 and stiffener 88 controlling the pivotal position of bracket 32, as described above.

All connections between the sealed environment between base plate 12 and cover 14 and printed circuit assembly 52 are provided by header 30. Pins 31a, which engage reverse flex circuit 34, also engage motor wire connector 92. Pins 31b extend below base plate 12 and engage a rear entry connector (not shown) on printed circuit assembly 52. A rear entry connector is utilized because the integrated and discrete circuit components and the surface wirings are on the side of printed circuit assembly 52 facing away from base plate 12.

Figure 4:
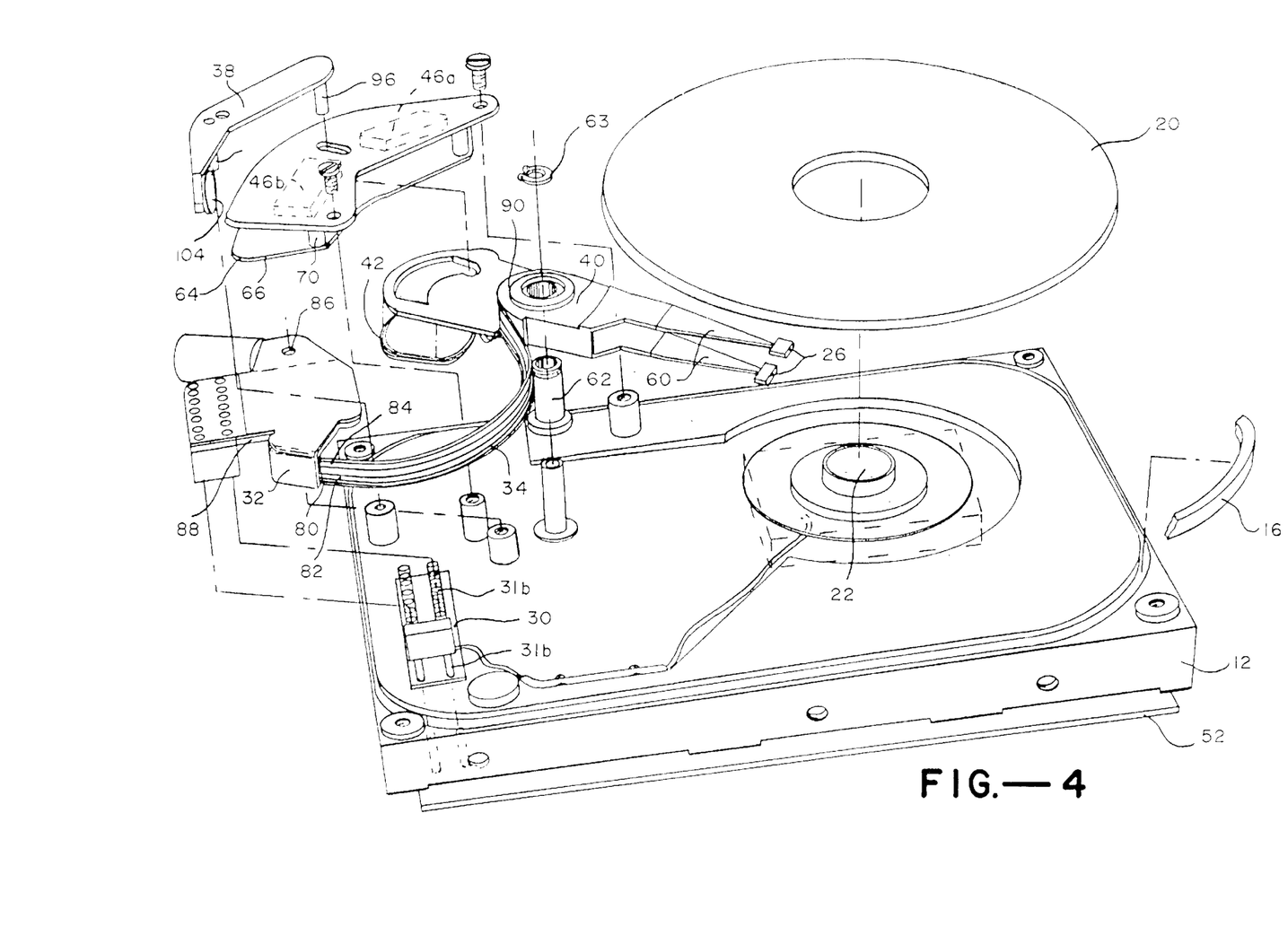
FIG. 4 is an exploded view of the disk drive of the present invention.
Figure 7:
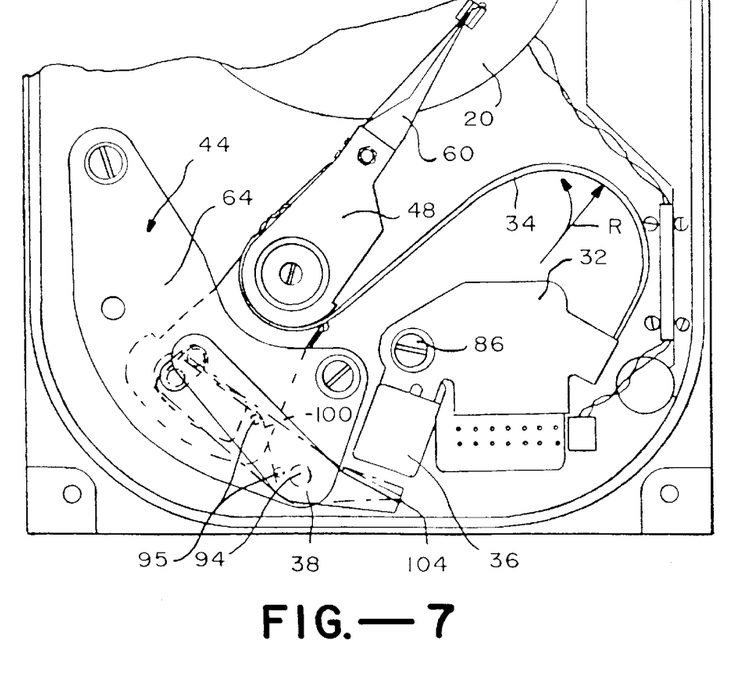
FIG. 7 illustrates the latch mechanism.

A latch mechanism for locking the actuator arm 40 in an orientation where heads 26 are positioned at the inside diameter 48 of disk 20, will be described with reference to FIGS. 4, 5 and 7. During power-down of the disk drive 10 control means 52 causes actuator assembly 24 to pivot the actuator arm 40 to the position where the heads 26 are at the inside diameter of the disk over a non-data area of disk 20 before the rotational speed of the disk 20 is decreased to the point where the heads 26 land on the disk 20. Thus, the heads 26 land only on the non-data area at the inside diameter of the disk 20.

The electromagnetic latch includes latch coil 36, a latch arm 38 which pivots on pivot 94 and has a finger 96 for engaging latch notch 98 in actuator arm 40, and a spring 100 for biasing the latch arm 38 to the locked position.

An electromagnet, including latch coil 36 and swivel plate 104, is used to pivot latch arm 38 to the unlocked position against the force of spring 100. Latch coil 36 includes a capture plate 106 having an outer wall 108 and a center pole 110. The outer wall 108 and center pole 110 form opposite poles of an electromagnet, and when a current is passed through a coil (not shown) the magnetic field of capture plate 106 attracts swivel plate 104; swivel plate 104 is mounted on the latch arm 38 so that it can swivel in all directions and be flush with the outer wall 108 when the swivel plate 104 is captured by the electromagnet. Contact between the entire outer wall 108 and swivel plate 104 is necessary to provide reliability in the capture and retention of the swivel plate 104. Center pole 110 of capture plate 106 is stepped so that only a small contact area exists between center pole 110 and swivel plate 104; this small contact area causes the latch coil 36 to release the swivel plate 104 when the current in the coil (not shown) is discontinued. A high DC voltage is applied to the latch coil 36 for a short time to capture the swivel plate 104. Then, the applied voltage is reduced to a small capture maintenance level. Thus, this structure is low in power consumption and heat dissipation. Further, despite the low power consumption of the latch coil 36 it is highly reliable in its capture, holding, and release of swivel plate 104.

Spring 100 is a linear spring engaging finger 96. To reduce spring travel, thereby providing a constant and larger spring force, spring 100 is terminated outside the pivot point of pivot 94.

Finger 96 also serves as the inside diameter crash stop. Finger 96 is well suited for the inside diameter crash stop because it is positioned to engage notch 98 which is at one edge of opening 102 in actuator arm 40. The abutment of finger 96 and the same edge of opening 102 when the latch is unlatched provides the inside diameter crash stop. However, the pivoting movement of latch arm 38 in moving to the latched position reduced the distance between pivot 94 and the edge of opening 102. Therefore, the actuator arm 40 pivots slightly to move the heads beyond the inside diameter 48 to a non-data area.

The above-described structure of the disk drive of the present invention provides excellent protection from shock and vibration. In particular, the disk drive will withstand nonoperating shocks of 200 g's and operating shocks, without nonrecoverable errors, of 5 g's. Nonoperating vibration of 2 g's in the range of 5–500 Hz is the specified tolerable limit. Operating vibration, without nonrecoverable data, is specified at 0.5 g's for the range of 5–500 Hz.

The disk 20 has 752 tracks per surface due to the ability of the actuator assembly 24 to operate with a track density of 1150 tracks per inch. Thus, utilizing 26 blocks per track and 512 bytes per block, the disk drive of the first embodiment has a formatted capacity of 20 MBytes. The actuator assembly 24 provides an average seek time of 28 ms and a track-to-track seek time of 7 ms. The average seek time is determined by dividing the total time required to seek between all possible ordered pairs of track addresses by the total number of ordered pairs addressed.

The assembly of the disk drive 10 of the present invention requires less steps than assembly of conventional disk drives. The spin motor 22 and disk 20 are attached to base plate 12. Then, an integrated actuator group, including actuator arm 40, bracket 32, reverse flex circuit 34, and latch coil 36, all previously assembled, is installed. Magnet structure 44 is then placed on one of its attachment points and pivoted into position so that the portion of actuator arm 40 holding actuator coil 42 extends between the top and bottom plates 64, 66 of the magnet structure 44. Latch arm 36 is then placed on its pivot point. The disk 20 is then pack written, and thereafter cover 14 is attached. Finally, printed circuit assembly 52 is attached outside of the clean room.

Those skilled in the art will appreciate that the structure of the disk drive of the present invention as described herein can be scaled for use with disk drives having disks with smaller and larger than 3.5 in.

The many features and advantages of the disk drive of the present invention will be apparent to those skilled in the art from the Description of the Preferred Embodiments. Thus, the following claims are intended to cover all modifications and equivalents falling within the scope of the invention.

I claim:

1. A disk drive responsive to a host computer, comprising:

a base, said base having a top and a bottom, and an actuator mounting point;

a cover sealably attached to said top of said base to provide a controlled environment substantially isolated from ambient atmospheric pressures between said cover and said base, said cover having an inner surface and an outer surface;

a spin motor mounted on said top of said base;

a disk mounted on said spin motor in said controlled environment, said disk defining a plane spaced a first distance from said inner surface of said cover;

at least one head for reading information from and writing information on said disk;

an actuator arm pivotally mounted on said actuator mounting point, said actuator arm having a first end for supporting said at least one head and a second end disposed on the opposite side of said actuator mounting point from said first end, said first end of said actuator arm being spaced a second distance from said inner surface of said cover and said second end of said actuator arm being spaced a third distance from said inner surface of said cover, said second distance being smaller than said first distance and said third distance being greater than said first distance;

magnet structure attached to said base and formed of a permeable material, said magnet structure comprising top and bottom plates and spacers for separating said top and bottom plates, said top plate being spaced a fourth distance from said inner surface of said cover, said fourth distance being greater than said second distance and equal to or greater than said first distance;

magnetic means, supported by said magnet structure, for providing a magnetic field;

a coil, supported by said second end of said actuator arm, for passing a current in the magnetic field; and control means, supported on the bottom of said base for generating control signals, and for providing information signals to and receiving information signals from said head.

* * * * *

UNITED STATES PATENT AND TRADEMARK OFFICE
CERTIFICATE OF CORRECTION

PATENT NO.   : 5,847,896
DATED        : 12/08/98
INVENTOR(S)  : Frederick M. Stefansky It is certified that error appears in the above-identified patent and that said Letters Patent is hereby corrected as shown below:

Col. 12, line 7:   should be "a magnet structure ..."

Signed and Sealed this

Twenty-ninth Day of June, 1999

Attest:

Q. TODD DICKINSON

*Attesting Officer*           Acting Commissioner of Patents and Trademarks